United States Patent
Temporiti Milani et al.

(10) Patent No.: US 8,989,601 B2
(45) Date of Patent: Mar. 24, 2015

(54) DRIVER FOR MULTI-STAGE WAVE GUIDE MODULATOR AND METHOD

(71) Applicant: STMicroelectronics S.R.L., Agrate Brianza (IT)

(72) Inventors: Enrico Stefano Temporiti Milani, Pavia (IT); Matteo Repossi, Pavia (IT); Daniele Baldi, Codevilla (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 72 days.

(21) Appl. No.: 14/043,375

(22) Filed: Oct. 1, 2013

(65) Prior Publication Data
US 2014/0105605 A1    Apr. 17, 2014

(30) Foreign Application Priority Data
Oct. 11, 2012  (IT) .............................. MI2012A1713

(51) Int. Cl.
H04B 10/50   (2013.01)
G02F 1/01    (2006.01)
G02F 1/025   (2006.01)

(52) U.S. Cl.
CPC ........ H04B 10/5051 (2013.01); H04B 10/5055 (2013.01); H04B 10/5053 (2013.01); G02F 1/0121 (2013.01); G02F 1/025 (2013.01); G02F 2201/20 (2013.01)
USPC ....................................................... 398/198

(58) Field of Classification Search
CPC ........... H04B 10/5051; H04B 10/5053; H04B 10/5055; G02F 1/025; G02F 1/0121; G02F 201/202
USPC ....................................................... 398/198
See application file for complete search history.

(56) References Cited

U.S. PATENT DOCUMENTS 7,039,258 B2   5/2006  Gunn, III et al.
7,317,846 B2   1/2008  Keil
(Continued)

FOREIGN PATENT DOCUMENTS

| JP | 01231019 A | * | 9/1989 | ................ G02F 1/03 |
| JP | 2002350792 A | * | 12/2002 | ............... G02F 1/015 |
| WO | WO2012/063413 | * | 5/2012 | ................ G02F 1/03 |

OTHER PUBLICATIONS

Liao HH et al, "Design of millimeter wave optical modulators with monolithically integrated narrow band impedance matching circuits for 1.3mum photonic links"; International Society for Optical Engineering, US, vol. 2844, Aug. 1, 1996 , pp. 97-107.
(Continued)

*Primary Examiner* — Leslie Pascal
(74) *Attorney, Agent, or Firm* — Allen, Dyer, Doppelt, Milbrath & Gilchrist, P.A.

(57) ABSTRACT

A modular hub driver architecture may include a multi-delay block configured to provide an enhanced delay match among N distinct stages of a distributed modulating electro-optical interface core. The electro-optical multi-core modulator driver may include an input impedance matching stage and a pre-conditioning circuit configured to generate a number M, an integer divisor of N, of delayed replicas of an electrical modulating signal. The electro-optical multi-core modulator may include an array of M launch buffers of the replica signals, and an array of M multi-delay blocks, each including delay circuit modules differently cascaded on distinct signal paths, and configured to receive, at respective inputs, the M replica signals and to output N/M differently delayed replicas of the input signals, each driving a correspondent output stage of one on the N electro-optical interface cores.

19 Claims, 6 Drawing Sheets

(56) References Cited

U.S. PATENT DOCUMENTS

| | | |
|---|---|---|
| 7,450,787 B2 | 11/2008 | Kucharski et al. |
| 7,515,775 B1 | 4/2009 | Kucharski et al. |
| 7,899,276 B2 | 3/2011 | Kucharski et al. |
| 2007/0237444 A1 | 10/2007 | Keil |
| 2009/0245813 A1 | 10/2009 | Bonthron |
| 2013/0176609 A1* | 7/2013 | Noguchi ............... 359/238 |
| 2014/0233962 A1* | 8/2014 | Kato ..................... 398/183 |

OTHER PUBLICATIONS

Long A., Buck, J., and Powell, R., "Design of an opto-electronic modulator driver amplifier for 40-Gb/s data rate systems," Lightwave Technology Journal, vol. 20, (2002), pp. 2015-2021.

Dogru S., JaeHyuk Shin, and Dagli, N., "Ultra-low voltage substrate-removed mach-zehnder intensity modulators with integrated electrical drivers," LEOS Annual Meeting Conference Proceedings, 2009, LEOS '09, IEEE, (2009), pp. 656-657.

* cited by examiner

DRIVER FOR MULTI-STAGE WAVE GUIDE MODULATOR AND METHOD

FIELD OF THE INVENTION

This disclosure relates in general to electrical-optical (E-O) interfaces for high speed voltage driving, and, in particular, to multi-stage modulator drivers for silicon based photonics applications.

BACKGROUND OF THE INVENTION

Electrical-Optical (E-O) interfaces are used in high-speed communication systems to convert an electrical signal into an optical signal. Typically, the E-O interface core includes a modulator configured to generate a modulated light power as a function of an electrical signal, and a driver, receiving, at the input, the electrical signal from preceding electronic stages and driving the modulator with voltage and current of sufficient magnitudes.

The driver may be particularly important in relatively high data rate applications since it provides relatively large output voltage levels with steep rising and falling edges for proper operation of the modulator and with limited jitter so as to not degrade the transmitted bit stream. At the same time, it may be desirable that the driver be designed to reduce its power consumption, since it contributes significantly to the overall power budget of a typical optical link.

In the specific case of Mach Zehnder Modulators (MZMs), due to the geometrical size of the interferometer used to build the MZM, for high speed operation, the driver is often split into several stages, each driving a portion of the MZM, thus forming a distributed modulating structure. In this case, it may be desirable that the driver stages allow their intrinsic delays to be programmed for proper operation of the distributed architecture by equalizing the optical delay of the light propagating within the MZM optical guides with the delay of the electrical signal propagating through the multiple stages of the distributed driver.

For high speed operation, a common high speed driver architectures includes travelling wave amplifiers with a termination load. (See for example, "Design of an opto-electronic modulator driver amplifier for 40-Gb/s data rate systems," Long, A., Buck, J., and Powell, R., Lightwave Technology Journal, Volume 20, (2002), Pages 2015-2021, and "Ultra-low voltage substrate-removed mach-zehnder intensity modulators with integrated electrical drivers," Dogru, S., JaeHyuk Shin, and Dagli, N., LEOS Annual Meeting Conference Proceedings, 2009, LEOS '09, IEEE, (2009), Pages 656-657). However, this kind of architecture generally suffers from a high power dissipation, part of which is wasted in the termination load.

Recently, alternative approaches that avoid a travelling wave architecture and based on cascaded delay stages have been proposed. (See, for example, U.S. Pat. Nos. 7,899,276, 7,515,775, 7,450,787 to Kucharski et al., and U.S. Pat. No. 7,039,258 to Gunn, III et al.). However, their use in high speed applications may be limited by the intrinsic structure of the modulator. In fact, the higher the operating data rate, the shorter each modulator stage should be to reduce the electrical length of its electrodes and thus improve the propagation of the electrical driving signal throughout the electrode length, even in the absence of a termination load. Reducing the length of each modulator stage, i.e. increasing the number of stages for a given total length, may include the formation of proportionally reduced delays between one stage and the following one. However, cascaded passive delay elements typically suffer from non-negligible losses, in particular, when integrated on-chip, and thus may introduce significant attenuation on the propagating signal. On the other hand, the intrinsic delay of active delay elements may be technologically limited and may not be arbitrarily reduced for a given integration technology, thus setting an upper limit to the operating data rate of these approaches.

SUMMARY OF THE INVENTION

To address the above discussed shortcomings and limitations of the prior art, a method includes coherently driving distributed electro-optical cores of a multi-stage modulator for high data rate applications. A modular hub architecture of the driver may also be included.

The modular hub architecture may include a multi-delay block that may include delay circuit modules differently combined on distinct signal paths that is replicated within the driver to provide for an enhanced delay match among the signals applied to distinct output stages of a distributed (multi stage) modulating electro-optical interface core. The output stages may be formed in the hub device itself or, depending from wave guide length and electrical characteristics of electrical connections at the modulation frequencies, may be formed near the driven electrodes coupled with the wave guide.

The driver modularity may greatly simplify and make possible a modular design of the whole electro-optical modulator in applications allowing a co-design of optics with electronics (e.g. in silicon photonics applications).

The driver may be particularly suitable for the formation of fully integrated E-O interfaces, e.g. on a silicon photonics technological platform (either with monolithic integration of electronics with photonics, or with two assembled die, one dedicated to electronics and one to photonics). The drive may also be useful for more traditional E-O interfaces and with many kinds of distributed optical modulators.

For the sake of simplicity, the embodiments will be described in a single-ended configuration, though it can be formed in a differential configuration, as will become evident from the ensuing description.

DETAILED DESCRIPTION OF THE PREFERRED EMBODIMENTS

Figures 1A, 1B, 1C:
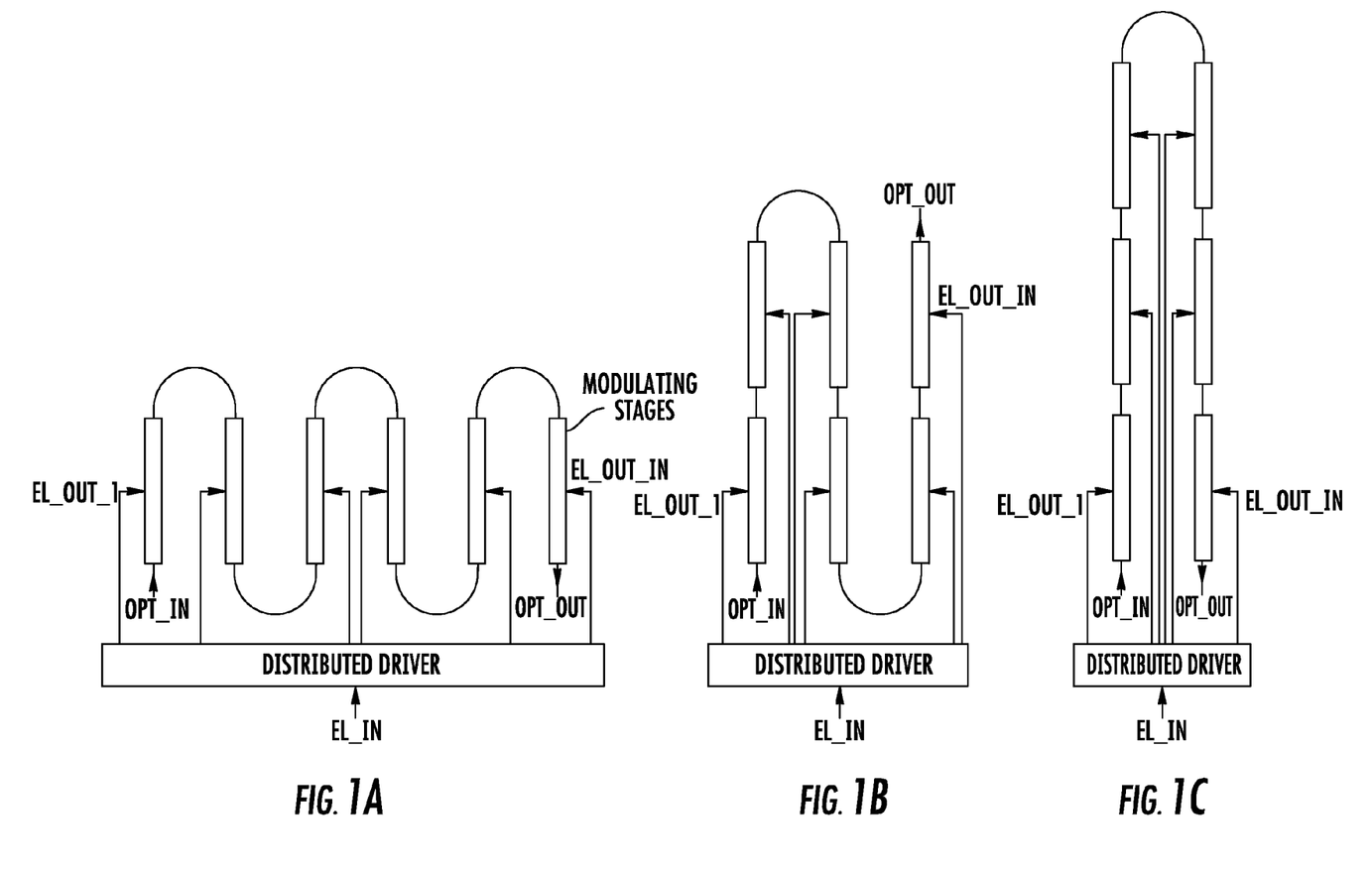
FIGS. 1a-1c are examples of three possible layouts for a 6-stage distributed optical modulator according to an embodiment.

As shown in the exemplary alternative layouts of FIG. 1, a distributed optical modulator made according to the embodiments is typically made of several (N) physically distinct modulating interface stages, the cumulated effects of which modulate a continuous wave optical input signal OPT_IN as a function of the electrical modulating signal EN_IN, producing the modulated optical output signal OPT_OUT. Customarily, to optimize its form factor, the optical waveguide may be laid out with one or more bends. The illustrated examples are all for an even number N=6 of distinct E-O modulator stages.

Whichever the layout, according to the method, a dedicated driving signal is applied to a final output stage of a respective core of a multi-core (distributed) electro-optical interface. The dedicated driving signals are replicas of a modulating input signal and have a progressively incremented delay with respect to the position of the corresponding electro-optical core along the propagation direction of the optical signal in the optical waveguide.

Figure 2:
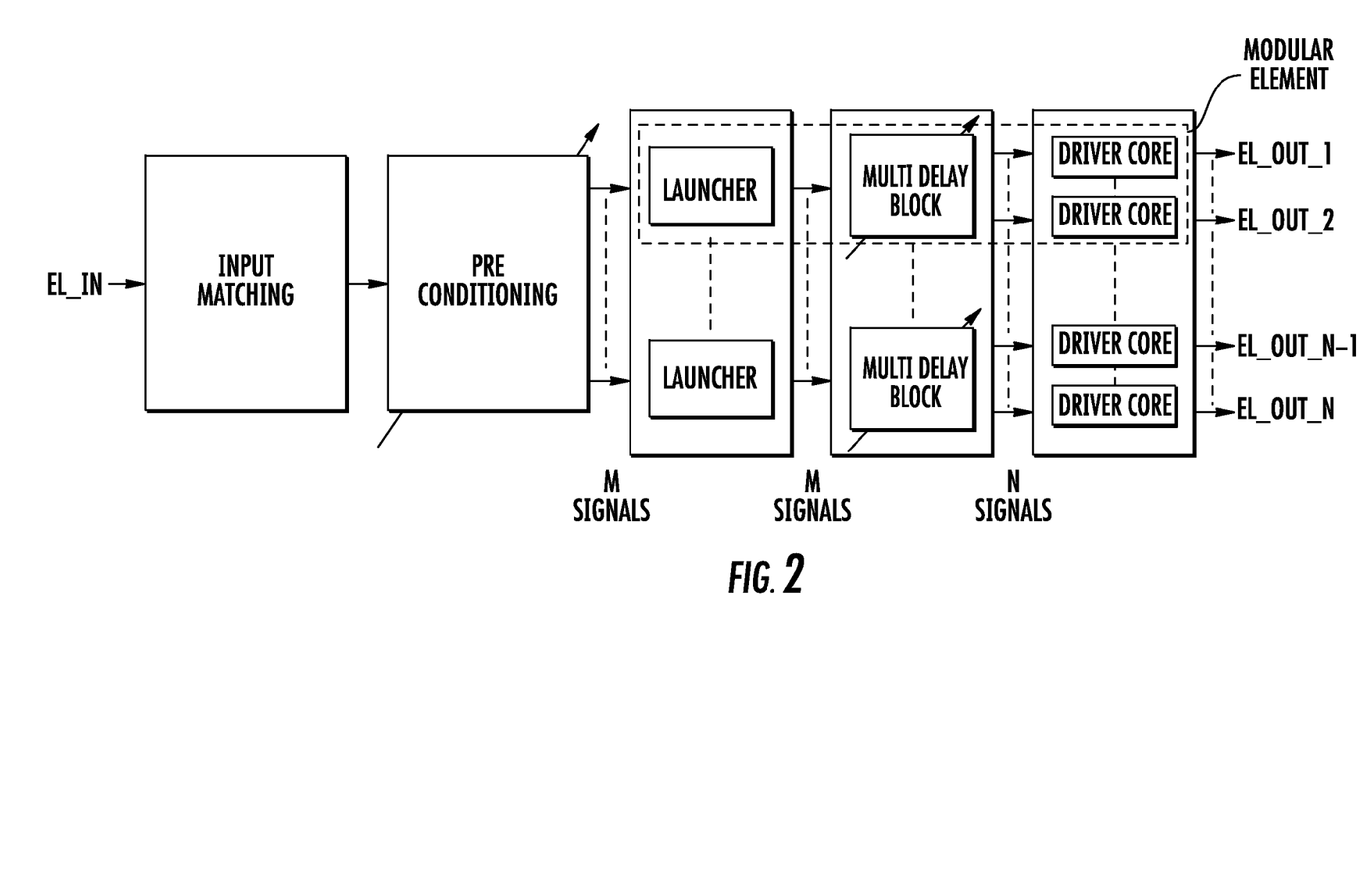
FIG. 2 is a block diagram of a distributed driver in according to an embodiment.

A basic block diagram of the modular multi-stage driver is illustrated in FIG. 2. The modular multi-stage driver includes an input impedance matching stage and a pre-conditioning circuit configured to generate a number M, integer divisor of a number N of cores, of delayed replicas of the electrical modulating signal (EL_IN). The multi-stage driver also includes an array of M launch buffers of the replica signals and a multi-delay block including delay circuit modules or circuitry differently combined on distinct signal paths and configured to receive, at respective inputs, the M replica signals, and to output N/M differently delayed replicas of the input signals, each driving a corresponding output stage (DRIVER CORE), also (DR), of one on the N cores that drive respective electrodes of the E-O interface. Optionally or depending on the length of the optical waveguide along which are distributed the E-O interface cores, the output stages (DR) may be implemented near the driven electrodes coupled with the optical wave guide.

The input matching stage matches the input impedance up to frequencies of several GHz. It is desirable that the delays introduced by the pre-conditioning block be programmable to allow tuning of the delays around their nominal value to compensate for possible variations of their delay value due to fabrication and/or process, voltage, and temperature (PVT) spreads. The iterative replica of the multi-delay block may simplify delay matching within the distributed driver. All or part of the delay circuit modules that define the multi-delay block may be replicated for also implementing the pre-conditioning block to further improve delay matching.

The M parallel launchers may be signal amplifying buffers with a large enough driving capability to drive the following driver stages. Together with the input matching and the pre-conditioning blocks, they effectively decouple the signal propagating within the modular driver from the external electrical input signal EL_IN. The value of M is chosen for optimizing overall performance of the driver, mainly in terms of power consumption and output rise/fall times.

The multi-delay block is used to generate N/M distinctly delayed replicas of each of the launched M signals according to the specific values desired such that for applications at several tens of Gbps there may be of the order of tens or even units of picoseconds. Therefore, depending on N, each delay circuit module of the multi-delay block may be formed either with active delay circuits, with passive delay networks, or with a combination of the two. Also, it may be desirable that the multiple distinct delays introduced in the multi-delay blocks be programmable to permit compensation of possible variations of the delay value due to fabrication and/or PVT spreads. In addition, to address layout issues arising from the geometrical size of the modulator, transmission lines may be used for connection to spatially distributed output stages. The output stages apply the drive signals (EL_OUTi) to the electrodes of the correspondent electro-optical interface core.

Figure 3A:
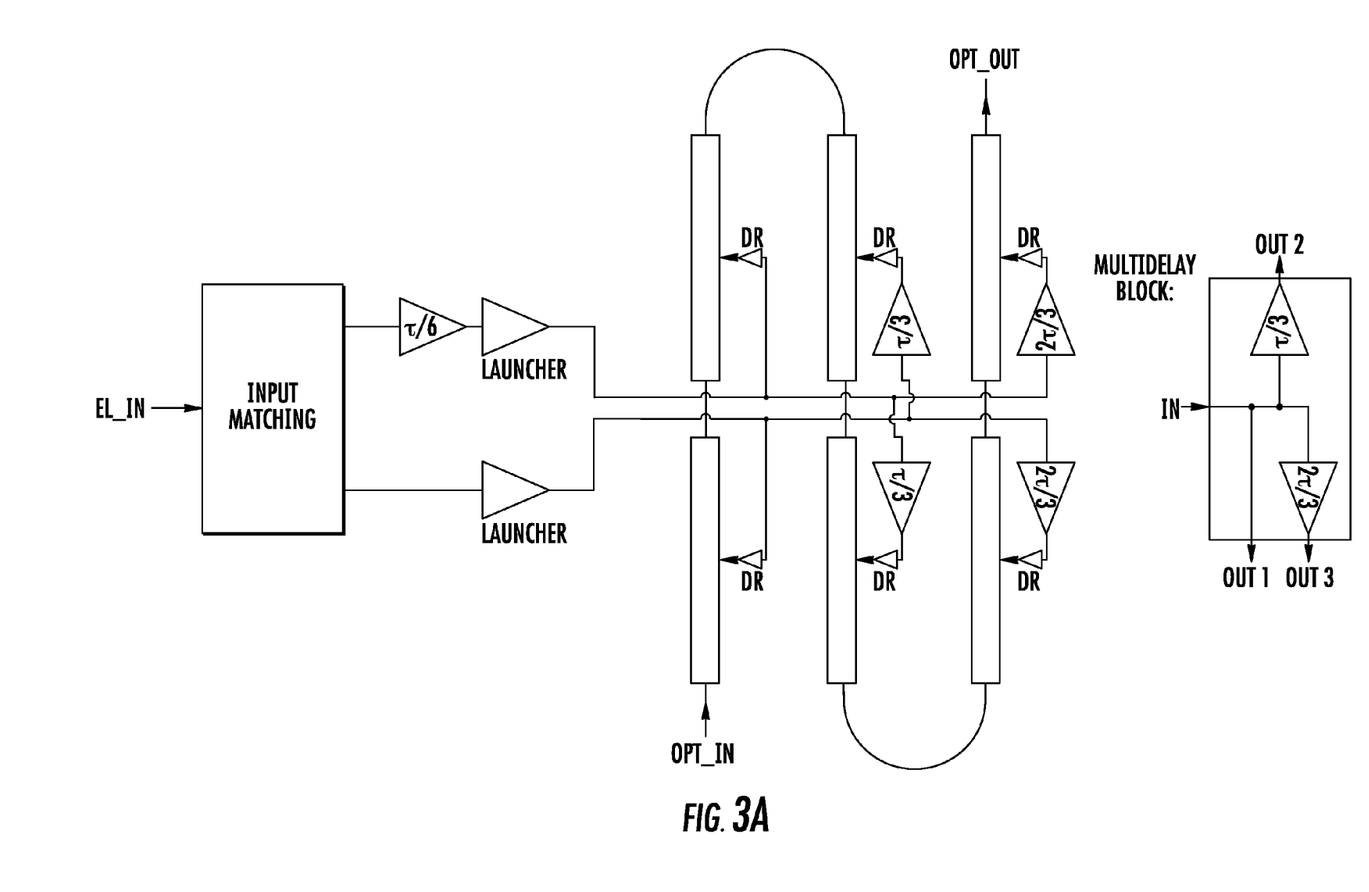
FIGS. 3a and 3b are alternative embodiments of driver architecture for N=6 and M=2, and N=6 and M=3, respectively according to an embodiment.
Figure 3B:
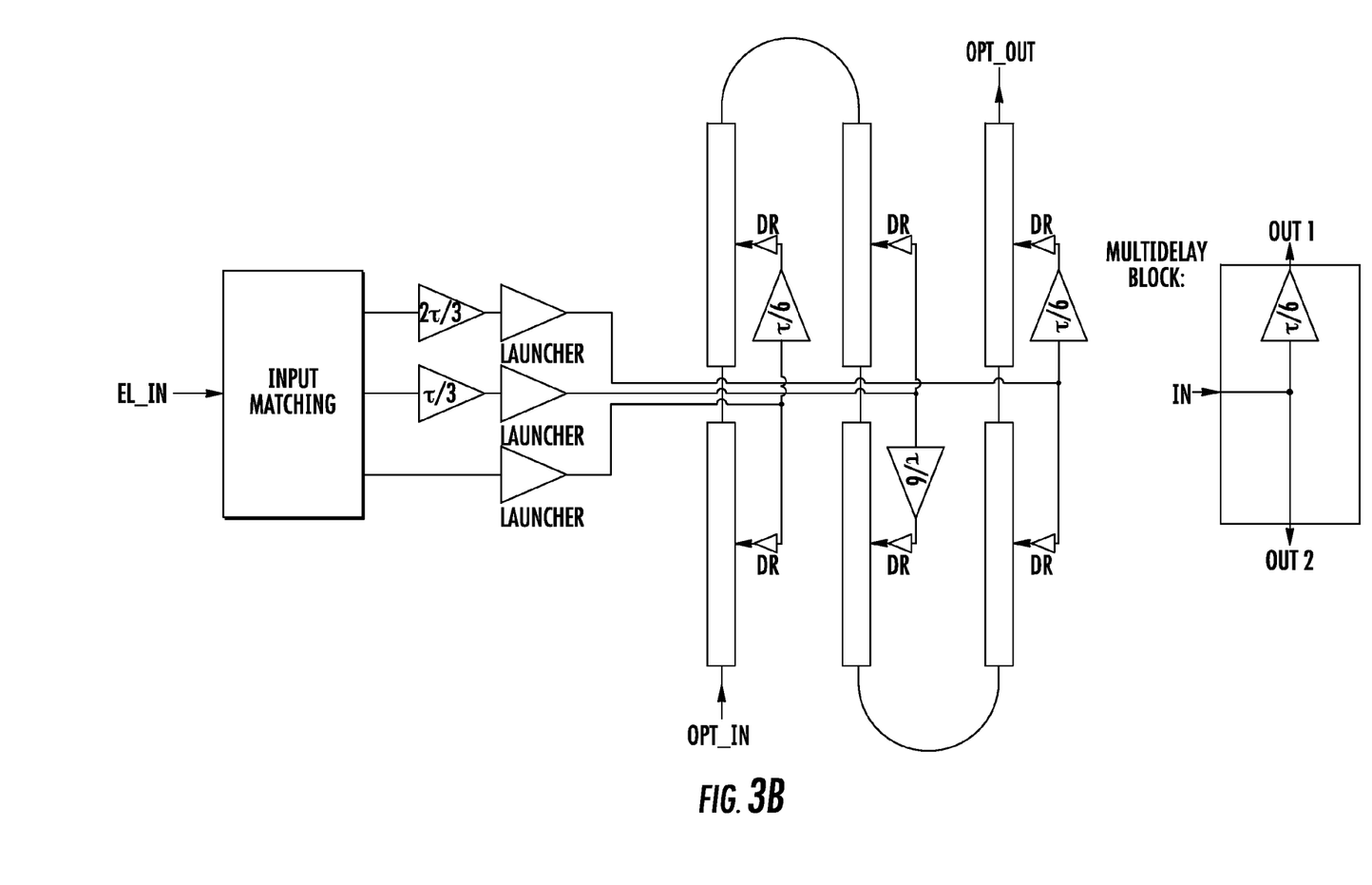

Two alternative examples of possible implementations of the driver architecture, respectively for N=6 and M=2 or M=3, are shown respectively in FIGS. 3a and 3b, where $\tau$ indicates the total optical delay along the waveguide of the distributed modulator. To increase the performance and the modularity of the architecture, the number of delay circuit modules of the multi-delay block may not necessarily be the same for the different electro-optical cores.

The modular driver may have advantages compared to a distributed driver using a single delay element per driver core, each directly receiving at the input the same EL_IN signal, because the driver architecture may be implemented using delay circuit modules of values significantly closer to each other. This may thus greatly facilitate accomplishment of a precise matching among replicated delay elements.

Figure 4:
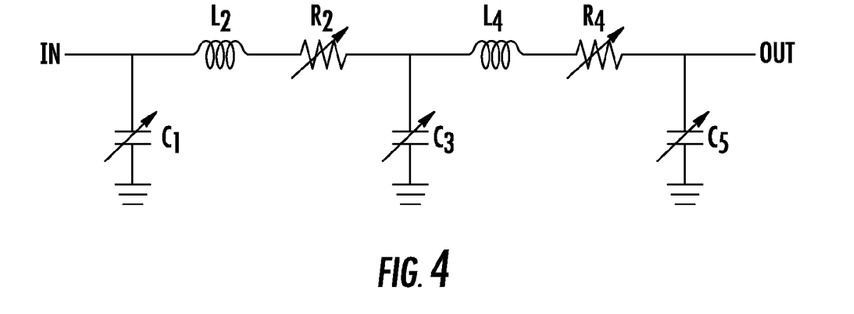
FIG. 4 is a schematic diagram of an example programmable passive ladder filter usable according to an embodiment.

In case of data rates on the order of tens of GHz, delay values in the range of units of picoseconds may be desired. Such values may be relatively hard to achieve with traditional delay elements while achieving, at the same time, a relatively low power consumption. In these conditions, passive ladder filters with programmable time constants may be used, as the one of the example shown in FIG. 4, where programmability is implemented by varying either resistances, or capacitances, or both, to introduce the desired delay and at the same time to realize a signal distribution line connection with the respective electro-optical core.

Figure 5:
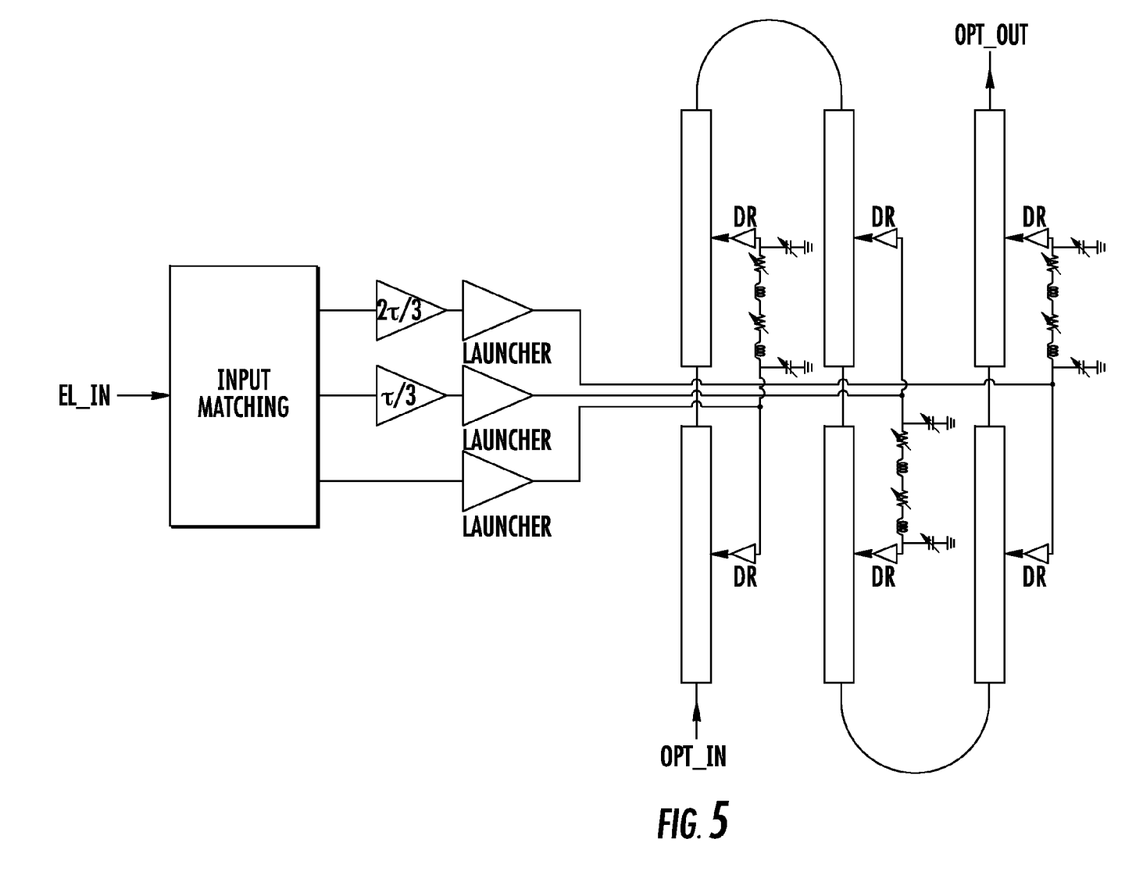
FIG. 5 is a diagram of a possible implementation of the driver for N=6, M=3 based on the use of a programmable passive ladder filter according to an embodiment.

The design of the ladder filter may be for the desired input-output delay and attenuation while its distributed layout can be formed to allow direct connection to the driver cores. An example of the application of the ladder filter to the topology of FIG. 3b is shown in FIG. 5.

Of course, the disclosed architecture, described in a single-ended configuration for simplifying its illustration, can be implemented in differential form by substituting single-ended signals, interconnections, and blocks with equivalent differential versions. Inverter stages instead of non-inverting buffers may also be used by adding dedicated ordinary means for phase correction where desired.

That which is claims is:

1. A driver for a number N of electro-optical interface cores each driven by a respective output stage of a multi-stage electro-optical modulator, the driver configured to receive an electrical modulating signal at an input and comprising:
    an input impedance matching stage;
    a pre-conditioning circuit configured to generate a number M, of delayed replicas of the electrical modulating signal, wherein M is an integer divisor of the number N of cores;
    an array of M launch buffers of the replica signals; and
    an array of M multi-delay blocks, each multi-delay block comprising a plurality of delay circuits differently cascaded on distinct signal paths, said array of M multi-delay blocks configured to receive, at respective inputs, the M replica signals, and to output N/M differently delayed replicas of the M replica signals, and each driving a corresponding output stage of one on said N electro-optical interface cores.

2. The driver of claim 1, wherein said plurality of delay circuits is configured to produce a delay of the electrical modulating signal, the delay being equivalent to a one of a fraction of a total optical delay along the multi-stage electro-optical modulator and a multiple thereof with one of the denominator M and a multiple thereof.

3. The driver of claim 1, wherein said plurality of delay circuits comprises a plurality of programmable delay circuits.

4. The driver of claim 3, wherein said plurality of programmable delay circuits comprises a plurality of passive ladder filters each having a programmable time constant.

5. The driver of claim 1, wherein said pre-conditioning circuit comprises programmable delay circuitry configured to compensate for variations based upon process, voltage, and temperature (PVT) spreads.

6. The driver of claim 1, wherein each respective output stage is adjacent a respectively driven electro-optical interface core.

7. The driver of claim 1, wherein each respective output stage is at least partly formed within an integrated driver device coupled to respectively driven electrodes of the N electro-optical interface cores.

8. A driver for a number N of electro-optical interface cores, the driver comprising:
 a pre-conditioning circuit configured to generate a number M, of delayed replicas of an electrical modulating signal, wherein M is an integer divisor of the number N of cores; and
 an array of M multi-delay blocks, each multi-delay block comprising a plurality of delay circuits differently cascaded on distinct signal paths, said array of M multi-delay blocks configured to output N/M differently delayed replicas of the M replica signals.

9. The driver of claim 8, wherein said plurality of delay circuits is configured to delay the electrical modulating signal, the delay being based upon one of a total optical delay and a multiple thereof with one of the denominator M and a multiple thereof.

10. The driver of claim 8, wherein said plurality of delay circuits comprises a plurality of programmable delay circuits.

11. The driver of claim 8, wherein said plurality of programmable delay circuits comprises a plurality of passive ladder filters each having a programmable time constant.

12. The driver of claim 8, wherein said pre-conditioning circuit comprises programmable delay circuitry configured to compensate for variations based upon process, voltage, and temperature (PVT) spreads.

13. A system comprising:
 an optical waveguide;
 a number N of electro-optical interface cores distributed along said optical waveguide; and
 a driver coupled to the N electro-optical interface cores and comprising
  a pre-conditioning circuit configured to generate a number M, of delayed replicas of an electrical modulating signal, wherein M is an integer divisor of the number N of cores, and
  an array of M multi-delay blocks, each multi-delay block comprising a plurality of delay circuits differently cascaded on distinct signal paths, said array of M multi-delay blocks configured to output N/M differently delayed replicas of the M replica signals.

14. The system of claim 13, wherein said plurality of delay circuits is configured to delay the electrical modulating signal, the delay being based upon one of a total optical delay and a multiple thereof with one of the denominator M and a multiple thereof.

15. The system of claim 13, wherein said plurality of delay circuits comprises a plurality of programmable delay circuits.

16. The system of claim 13, wherein said plurality of programmable delay circuits comprises a plurality of passive ladder filters each having a programmable time constant.

17. The system of claim 13, wherein said pre-conditioning circuit comprises programmable delay circuitry configured to compensate for variations based upon process, voltage, and temperature (PVT) spreads.

18. A method of driving a number N of electro-optical interface cores, the method comprising:
 generating a number M of delayed replicas of an electrical modulating signal, M being an integer divisor of the number N of cores;
 amplifying the M delayed replica signals; and
 conveying the amplified replica signals to respective signal path inputs of different combinations of a plurality of delay circuits for generating N/M differently delayed replicas of the amplified replica signals and each driving a corresponding output stage of one on the N electro-optical interface cores.

19. The method of claim 18, wherein the N/M differently delayed replicas of the electrical modulating signal have delays based upon one of a total optical delay and a multiple thereof with one of the denominator M and a multiple thereof.

* * * * *